United States Patent
Brochot et al.

(10) Patent No.: US 8,931,790 B2
(45) Date of Patent: Jan. 13, 2015

(54) PUSH DEVICE WITH CLEARANCE COMPENSATION FOR RACK-AND-PINION STEERING OF A MOTOR VEHICLE

(75) Inventors: Patrice Brochot, Oullins (FR); Laurent Rey, Villeurbanne (FR)

(73) Assignee: JTEKT Europe (FR)

( * ) Notice: Subject to any disclaimer, the term of this patent is extended or adjusted under 35 U.S.C. 154(b) by 438 days.

(21) Appl. No.: 13/503,543

(22) PCT Filed: Oct. 20, 2010

(86) PCT No.: PCT/FR2010/052233
§ 371 (c)(1),
(2), (4) Date: Jul. 5, 2012

(87) PCT Pub. No.: WO2011/048328
PCT Pub. Date: Apr. 28, 2011

(65) Prior Publication Data
US 2012/0266707 A1    Oct. 25, 2012

(30) Foreign Application Priority Data

Oct. 23, 2009  (FR) .................................... 09 57460

(51) Int. Cl.
*B62D 3/12*     (2006.01)
*F16H 55/28*    (2006.01)

(52) U.S. Cl.
CPC .............. *B62D 3/123* (2013.01); *F16H 55/283* (2013.01)
USPC ......... 280/93.514; 74/29; 74/388 PS; 74/422; 74/409

(58) Field of Classification Search
CPC ......... B62D 3/12; B62D 3/123; F16H 55/283
USPC ............ 280/93.514; 74/29, 388 PS, 422, 409
See application file for complete search history.

(56) References Cited

U.S. PATENT DOCUMENTS 4,785,685 A * 11/1988 Kobayashi et al. ............. 74/498
4,939,947 A *  7/1990 Toyoshima et al. ............ 74/422

(Continued)

FOREIGN PATENT DOCUMENTS

| EP | 0770538 A2 | 5/1997 |
|---|---|---|
| EP | 1738989 A1 | 1/2007 |
| FR | 2219868 A1 | 9/1974 |

(Continued)

OTHER PUBLICATIONS

International Search Report issued Dec. 22, 2010 by European Patent Office re: PCT/FR2010/052233, pp. 3; citing: EP 1 738 989 A1, GB 655 130 A, FR 2 219 868 A1, EP 0 770 538 A2, US 6,247,375 B1, US 2008/295629 A1.

*Primary Examiner* — Ruth Ilan
(74) *Attorney, Agent, or Firm* — Cantor Colburn LLP

(57) ABSTRACT

The invention relates to a push device (8) which includes a rotary pad (10) in which the inner periphery (11) is off-center relative to the outer periphery (12) and applied to the rear (9) of the rack (3) which is thereby pushed towards the teeth of the steering pinion (5). A clearance compensation mechanism (17) includes a thrust member (19) pressed against a radial arm (18) of the pad (10) by a compression spring (20) inserted between said member and an element (23) secured to the support (13) of the pad (10). A mobile stop (21) rotatably mounted relative to the element (23) comprises toothings having staggered gear teeth cooperating with notches of the thrust member (19). The stop (21) is connected to the element (23) by means of a torsion spring (22). The notches successively cooperate with the staggered teeth.

7 Claims, 4 Drawing Sheets

(56) References Cited

U.S. PATENT DOCUMENTS

| | | |
|---|---|---|
| 6,247,375 B1 | 6/2001 | Gierc et al. |
| 7,930,951 B2 * | 4/2011 | Eickholt .................... 74/388 PS |
| 2007/0209494 A1 * | 9/2007 | Moellering ................ 83/698.31 |
| 2008/0295629 A1 | 12/2008 | Song |

FOREIGN PATENT DOCUMENTS

| | | |
|---|---|---|
| GB | 655130 A | 7/1951 |

* cited by examiner

PUSH DEVICE WITH CLEARANCE COMPENSATION FOR RACK-AND-PINION STEERING OF A MOTOR VEHICLE

TECHNICAL FIELD

The present invention generally relates to rack-and-pinion steering for motor vehicles. More particularly, this invention relates to the so-called "push line" device, or more simply a "pusher" for such steering, the function of which is to keep the rack meshing with the steering pinion while offsetting the toothing defects, this device also serving to facilitate the mounting of the pinion in the casing of the rack-and-pinion steering system. Also more particularly, the invention relates to a so-called "off-center" pusher, which is provided with a system for automatically compensating for the clearance between the pinion and the rack.

BRIEF SUMMARY OF RELATED ART

In a motor vehicle rack-and-pinion steering system, a steering pinion is rotatably connected to a steering column, maneuvered using the steering wheel of the vehicle, often with the help of a hydraulic or electric assistance system. The steering pinion is engaged with a rack, slidingly mounted in the longitudinal direction in a steering gear-box. The two ends of the rack, outside the box, are respectively coupled to two tie rods, which in turn are respectively associated with the left and right steering wheels of the vehicle. In this way, the rotation of the wheel in one direction or the other, transmitted by the steering column to the pinion, is converted into a corresponding translational movement of the rack which, via the rods, causes the orientation of the steering wheels for steering right or steering left.

In such a steering system, the rack-and-pinion mechanism, connected to the front wheels of the vehicle via rods, is subject to the transfer of loads, shocks and vibrations, depending on the road traveled by the vehicle. Due to the angle formed by the rods with the rack, a load may then be produced on the rack, which risks moving it away from the pinion. For that reason, the rack is usually continuously pressed against the pinion by a so-called "pusher" device, acting elastically on the back of the rack in the region of the pinion to strongly press the toothing of that rack against the pinion. Owing to such a pusher, the meshing defects of the rack with the pinion are offset, and said pusher also ensures the guiding of the rack, while controlling the sliding force of that rack in the steering gear-box.

In its most common embodiment, the pusher device comprises the pusher strictly speaking, which is a rigid piece translationally mounted in a direction substantially perpendicular to the longitudinal axis of the rack, and which is stressed toward the back of the rack by elastic means, so as to press on the back of the rack by an end portion with a suitable shape, in particular a concave profile, generally made up of a friction pad making it possible to have a low coefficient of friction between said pad and the rack. The elastic means can be made up of a spiral spring alone or a metal or elastomer elastic washer, or by associating such elastic elements. These elastic means bear on an adjusting screw, which makes it possible to adjust the withdrawal of the pusher and thus embodies the end-of-travel stop of the pusher.

As previously indicated, such a device makes it possible to obtain permanent contact between the pinion and the rack, while offsetting the flaws in the toothings of these components. The elastic means, due to their action between the adjusting screw and the pusher, also make it possible to offset the wear during operation of the pinion, the rack and the friction pad, but in that case the withdrawal, i.e. the gap between the pusher and its stop formed by the adjusting screw, is increased by a value equal to the cumulative wear of these three components.

The main drawbacks of such a pusher, and the effect of increasing the withdrawal that is not offset, are a probability of the appearance of noise in case of rolling of the vehicle on a deteriorated roadway, and an increase in the bending momentum in the contact zone of the gear teeth of the pinion and the rack, in particular in case of operation at a full load. Another drawback of this pusher device is that it requires an expensive adjustment on an assembly line.

Pusher devices are also known with a different design, called "off-center" pushers, as for example described in patents U.S. Pat. No. 6,247,375 B1, FR 2219868, EP 0770538 A2 and US 2008/0190229 A1. In such a device, a rotary pad comprises an off-center part that pushes the rack toward the pinion, the rotary pad being mounted rotating in a casing, around an axis parallel to the longitudinal axis of the rack. The inner periphery of this pad is off-centered relative to the outer periphery thereof, such that, when it rotates in the casing, its off-centered part forms a step that is pressed against the back of the rack and pushes the latter toward the gear teeth of the pinion, so as to keep them engaged.

In one particular embodiment of an off-center pusher, described in French patent application 08.06207, filed on Nov. 6, 2008 in the Applicant's name, published on May 7, 2010 under number FR 2938034, the rotary pad is mounted rotating on a support housing, which in turn is slidingly mounted in the steering gear-box, in a direction parallel to the plane of the toothing of the rack and orthogonal to the longitudinal axis of that rack. An elastic element such as a compression spring is positioned between the wall of the sliding housing and the rotary pad, to stress that pad in rotation in a predefined direction. Another elastic element such as an O-ring is positioned between the sliding housing and a stationary part, such as the steering gear-box. The pad comprises a radial arm, on which the force of the compression spring is exerted. The pad has a bowed "corner" shape that allows the device to be particularly compact.

However, the current off-center pusher devices generally do not have a robust and irreversible system, allowing, however, slight operating clearance, to absorb the clearance of the gear teeth.

BRIEF SUMMARY

The present invention therefore aims to provide an improved embodiment of an off-center pusher, which in particular has an automatic clearance compensating function, with controlled withdrawal.

To that end, the invention relates to an off-center push device for the rack-and-pinion steering of a motor vehicle, the push device comprising a bowed pad whereof the inner periphery is off-centered relative to the outer periphery, the pad being rotated in one direction by spring means and being provided to be pressed by its off-centered inner periphery against the rear of the rack to push the latter back toward the gear teeth of the steering pinion, the pad being rotatably mounted on a support and the spring means, arranged at the support, preferably acting in a plane parallel to the toothing of the rack on a radial arm secured to the pad, said off-center push device being characterized in that it comprises a clearance compensation mechanism including a thrust member translationally mounted on the support, but immobilized in rotation relative to said support, and pressed against the radial arm of the pad by a compression spring inserted between said thrust member and the support or an element secured to the support, whereas a movable stop is rotatably mounted, coaxially to the compression spring, relative to the support or the element secured to the support, the movable stop being provided, at the end thereof closest to the pad, with at least one toothing with staggered gear teeth cooperating with at least one notch formed on the thrust member, or vice versa, the movable stop being connected via a torsion spring to the support or to the element secured to the support, so that the notch(es) can successively cooperate with the staggered gear teeth of the or each toothing.

Advantageously, the movable stop is provided with at least two toothings with staggered gear teeth, arranged on as many sectors, for example two diametrically opposite toothings each occupying a sector of 180°, and the thrust member comprises the same number of notches cooperating with those toothings, so as to stabilize the mechanism.

The thrust member can comprise two diametrically opposite longitudinal grooves, which cooperate with two corresponding ribs provided on opposite surfaces of the support, to ensure translational guiding and rotational immobilization of this thrust member.

The off-center pusher is thus provided with a clearance compensation mechanism, which operates by "thresholds" going from one tooth to the other of the staggered gear teeth of the movable stop, which makes it possible to reduce the operating clearance. The components of this mechanism also ensure the basic operation of the off-center pusher: the thrust member is the part that transmits the thrust exerted by the compression spring to the pad, the compression spring in turn bearing against said thrust member, to generate the force that keeps the rack in contact with the pinion.

In normal operation, between two clearance adjustments, the mechanism is in a configuration where the notches of the thrust member are in contact against the gear teeth of the movable stop, the contact being maintained by the torsion spring. When, after wear, and under the action of the compression spring, the clearance exceeds a certain value with the result that there is no longer any contact between the notches of the thrust member and the gear teeth of the toothings of the movable stop, the torsion spring rotates said movable stop until a new contact is created, made between the notches of the thrust member and the gear teeth along the toothings of the movable stop. The clearance is thus reduced to a smaller value, and so forth.

BRIEF DESCRIPTION OF THE DRAWINGS

The invention will be better understood upon reading the following description, in reference to the appended diagrammatic drawing showing, as an example, one embodiment of this off-center push device.

DETAILED DESCRIPTION

Figure 1:
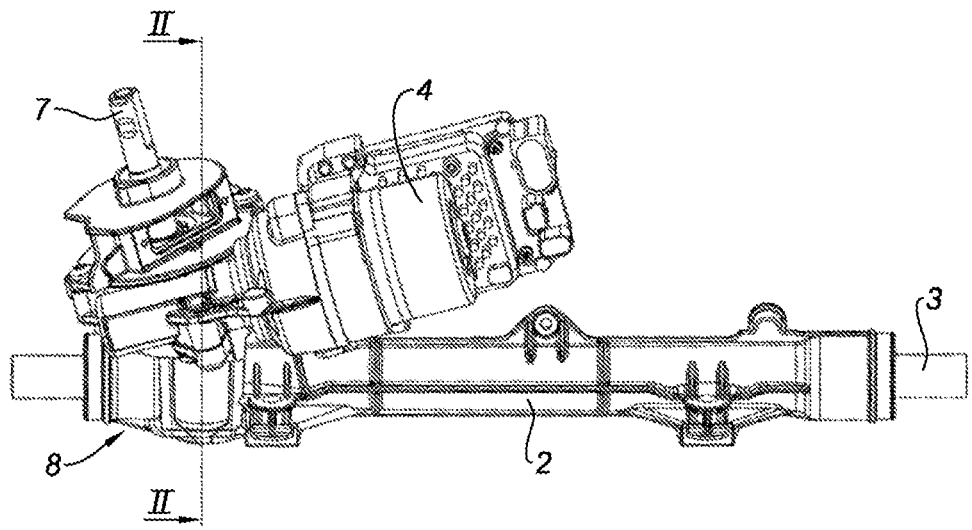
FIG. 1 is an outside view of a power-assisted steering system, equipped with the off-center push device according to the present invention.

FIG. 1 shows a power-assisted steering system for a motor vehicle, with an assistance system acting at the steering pinion. The steering system comprises a steering gear-box 2, which extends along a longitudinal axis A. Slidingly mounted in the steering gear-box 2 is a rack 3, the ends of which leave the ends of the casing 2 and are coupled to tie rods (not shown here). A power assistance motor 4 is coupled, via a speed reduction gear, to a steering pinion 5 that is engaged with the toothing 6 of the rack 3 (see also FIG. 2). Reference 7 indicates the input shaft, which is connected to the steering pinion 5 and to which the steering column (not shown) is coupled, maneuvered using the steering wheel of the vehicle.

Figure 2:
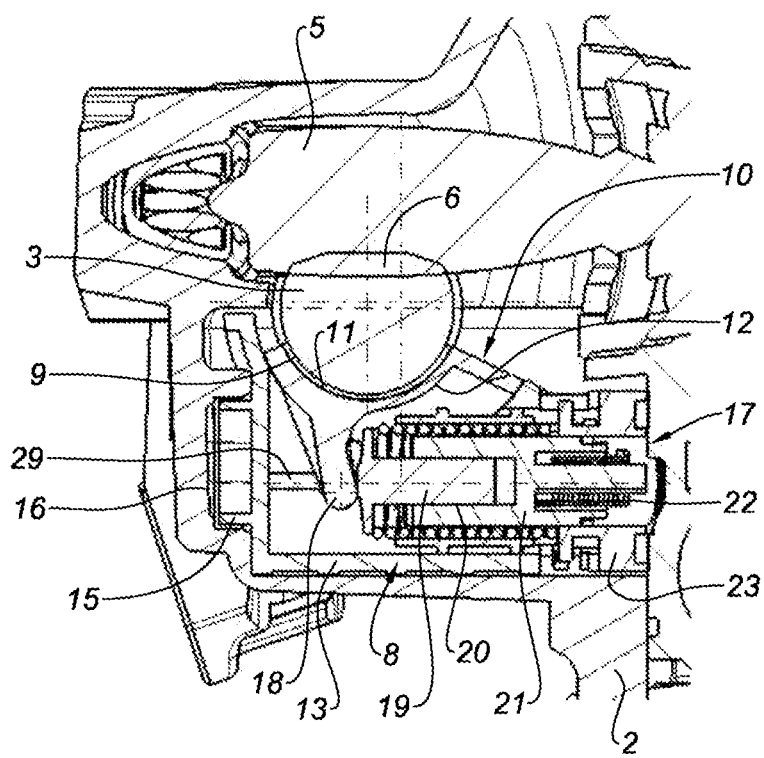
FIG. 2 is a cross-sectional view along II-II of FIG. 1, i.e. along a plane perpendicular to the longitudinal axis of the rack and passing through the off-center push device.

A push device, designated overall by reference 8, is provided near the steering pinion 5, to press the toothing 6 of the rack 3 against the pinion 5, the push device 8 being shown in detail in FIG. 2 and following.

The push device 8 is placed on the rear side 9 of the rack 3, in other words opposite the toothing 6 of that rack 3 and also opposite the pinion 5, this push device 8 being housed in a corresponding part of the steering gear-box 2.

The push device 8, of the "off-center" type, comprises a pad 10 as main component, which is a part with a rounded profile, and, more particularly, an arched part with a "corner" shape. The pad 10 has an inner periphery 11 in an arc of circle that is off-centered relative to its outer periphery 12, which is also in an arc of circle. The inner periphery 11, thus off-centered, of the pad 10 forms a step pressed against the rear 9 of the rack 3.

Figure 3:
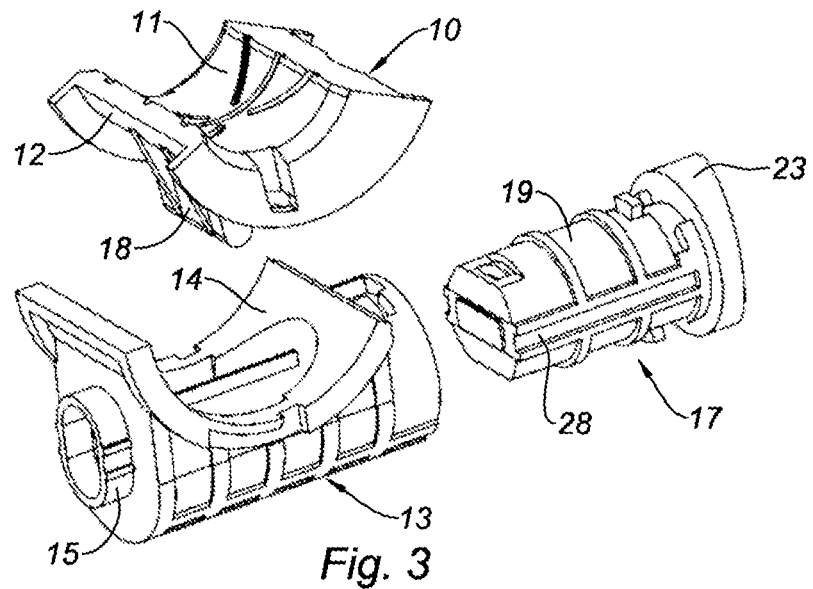
FIG. 3 is an exploded perspective view of this push device.

The pad 10 is mounted and guided on a support 13, which in turn is mounted in the considered part of the steering gear-box 2, the configuration of the support 13 being clearly visible in FIG. 3. This support 13 comprises a cradle 14 with a bowed shape, on which the outer periphery 12 of the pad 10 bears slidingly. At one end, the support 13 has an oblong protuberance 15, engaged in a corresponding recess 16 of the concerned casing portion.

The pad 10 is shown as a monolithic piece, but it can also be made in two or more parts from separate materials, adapted for sliding contact with the rack 3 on the one hand and with the support 13 on the other hand. Various methods of guiding the pad 10 on the cradle 14 of the support 13 can be considered, to produce the rotational connection between the pad 10 and the support 13.

Figure 4:
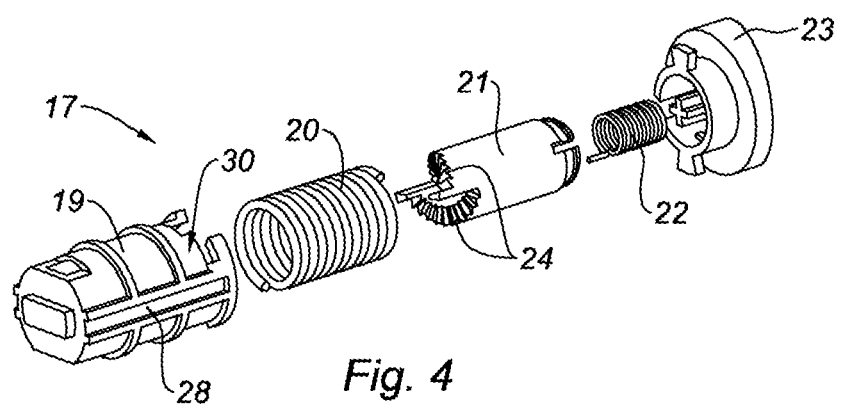
FIG. 4 shows, in exploded perspective view, the clearance compensation mechanism of the push device, with its various components.

The pad 10 is set in rotation relative to the support 13 by applying thrust, exerted by a clearance compensation mechanism 17 on a radial arm 18 comprised by the pad 10. The details of the clearance compensation mechanism 17 are shown in FIG. 2, as well as FIG. 4 and following.

The clearance compensation mechanism 17 is made up of five main elements, i.e.: a thrust member 19, a compression spring 20, a movable stop 21, a torsion spring 22, and a bearing member 23, all arranged coaxially.

Figure 7:
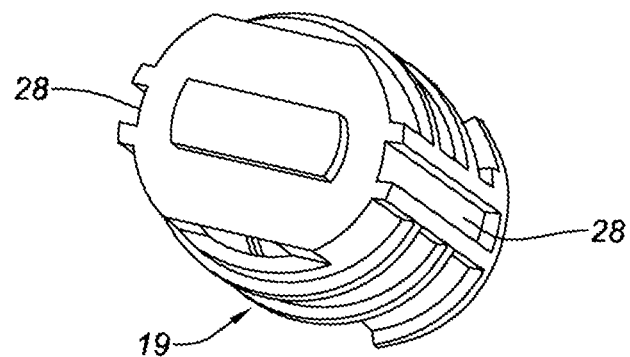
FIG. 7 is a perspective view of the bearing member of the clearance compensation mechanism.

The bearing member 23, shown only in FIG. 7, is connected to the support 13 in the part thereof opposite the protuberance 15, so that there is no relative movement between the bearing member 23 and the support 13 during operation.

Figure 5:
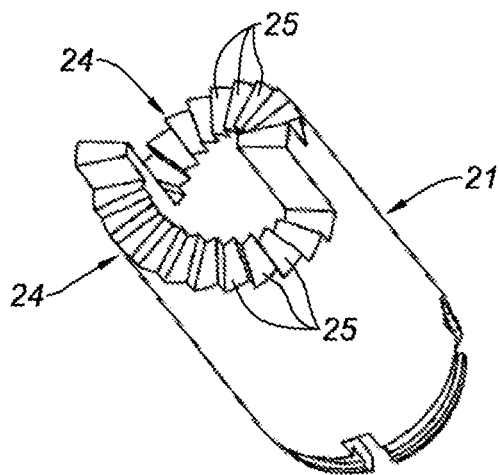
FIG. 5 is a perspective view, on a larger scale, of the movable stop of the clearance compensation mechanism.

The movable stop 21, generally cylindrical and hollow in the center thereof (see FIG. 5), is mounted rotating relative to the bearing member 23, in which it fits. At its end spaced away from the bearing member 23, the movable stop 21 has two staggered toothings 24, which respectively extend over two 180° sectors. Each toothing 24 comprises a series of gear teeth 25.

Figure 6:
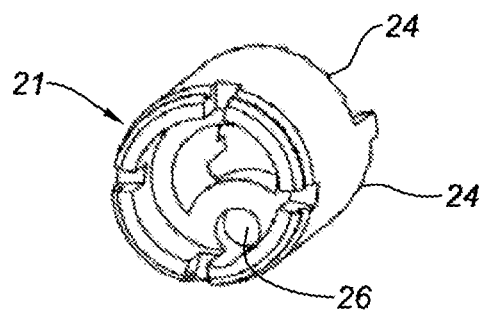
FIG. 6 is another perspective view of the movable stop, showing the end thereof opposite the toothings.

At its end opposite the toothings 24 (see FIG. 6), the movable stop 21 has a housing 26 provided to receive one end of the torsion spring 22. The other end of the torsion spring 22 is received in a fastening zone 27 provided on the bearing member 23 (see FIG. 7).

Figure 8:
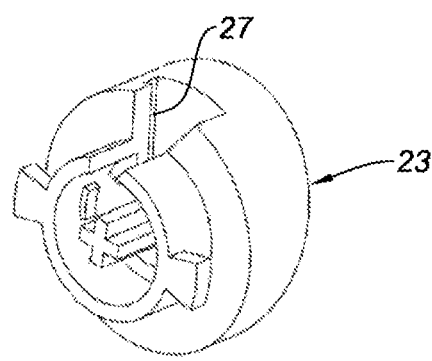
FIG. 8 is a perspective view of the thrust member of said mechanism.

The thrust member 19, shown only in FIG. 8, is generally cylindrical. It comprises two diametrically opposite longitudinal grooves 28, which cooperate with ribs 29 provided on opposite surfaces of the support 13 (see also FIG. 2), to guide the translation of said thrust member 19 while immobilizing it in rotation. In the mounted position, the thrust member 19 is pressed against the radial arm 18 of the pad 10. The thrust member 19 also comprises two diametrically opposite notches 30, which are provided each to cooperate with one of the gear teeth 25 of the toothings 24 of the movable stop 21.

In the mounted position of the clearance compensation mechanism 17, in the illustrated example, the compression spring 20 is situated outside the movable stop 21. One end of the compression spring 20 bears on the bearing member 23, while the other end thereof bears against the thrust member 19. The torsion spring 22 is housed in the central recess of the movable stop 21; this torsion spring 22 is hooked by one end to said movable stop 21, in the housing 26, while the other end thereof is fastened to the bearing member 23, in the fastening zone 27.

Figure 9:
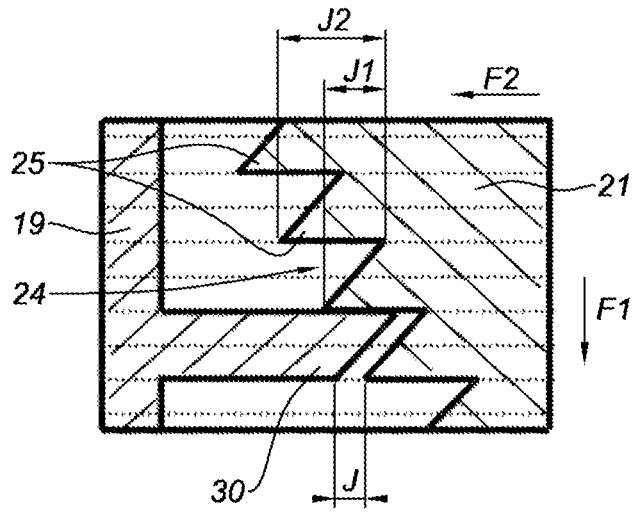
FIGS. 9 and 10 are diagrams illustrating the operation of the clearance compensation mechanism.

During normal operation, as illustrated in FIG. 9, the clearance compensation mechanism 17 is in a configuration for which each notch 30 of the thrust member 19 is in contact against a wall of a gear tooth 25 of a toothing 24 of the movable stop 18, the contact being maintained by the torsion spring 22, which acts in the direction of arrow F1. The thrust from the compression spring 20, acting in the axial direction of the arrow F2, is exerted on the thrust member 19, which transmits it to the pad 10, so that the rack 3 is kept in contact with the steering pinion 5. This operating state is maintained for any clearance J comprised between a minimum clearance value J1 and a maximum clearance value J2.

Figure 10:
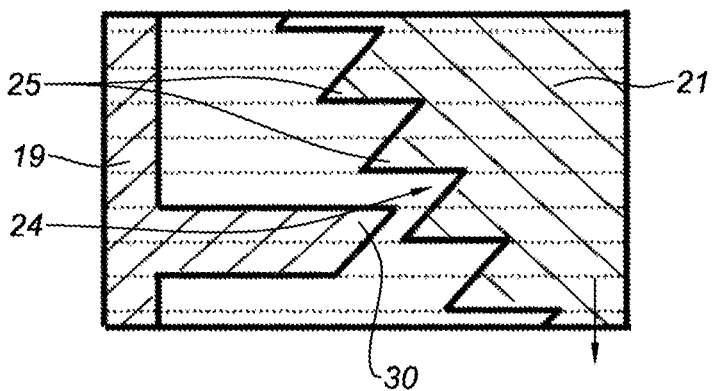

When the clearance J exceeds the maximum clearance value J2, due to wear that has become relatively significant, the contact between the notches 30 of the thrust member 19 and the gear teeth 25 of the movable stop 21 no longer exists (see FIG. 10). At that time, the torsion spring 22 rotates the movable stop 21, until a new contact occurs between each notch 30 of the thrust member 19 and the following gear teeth 25 of the toothings 24 of the movable stop 21. The clearance J has thus been reduced to the minimum clearance value J1, the clearance compensation mechanism 17 being brought back into the configuration of FIG. 9, but with contact on the following, "higher" gear tooth 25 of each staggered toothing 24.

As also shown in FIGS. 9 and 10, the gear teeth 25 of at least one staggered toothing 24 advantageously have a globally triangular profile. Owing to such a configuration, during the rotation of the movable stop 21, a slight withdrawal of the pad 10 is authorized in the idle position, which makes it possible to obtain clearance between the rack 3 and the steering pinion 5, to absorb the toothing defects of those elements.

Figure 11:
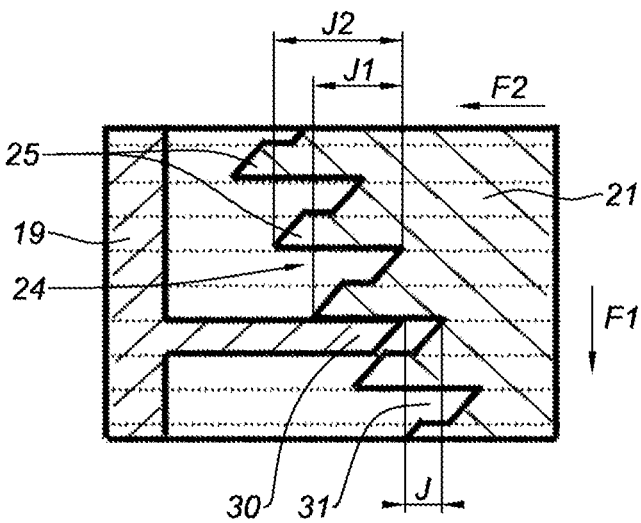
FIG. 11 is a diagram similar to the preceding figures, showing an alternative relative to the toothings of the movable stop.

FIG. 11 shows an alternative form of the gear teeth 25 of the staggered toothings 24. Keeping a triangular appearance, the gear teeth 25 here comprise asperities and/or notches 31, which are provided for embedding of the notches 30, so as to stabilize the movable stop 21 in the idle position.

Lastly, in a manner not shown, the support 13 can be mounted in the corresponding casing portion with the interposition of one or more seals capable of absorbing noises and vibrations.

It would not be beyond the scope of the invention, as defined in the appended claims, to:
Modify the details of the toothings of the movable stop;
Use any equivalent arrangements, in particular in the clearance compensation mechanism where the position of the parts can be inverted, for example with a torsion spring having a larger diameter placed outside the movable stop, and a compression spring having a smaller diameter placed inside the movable stop, or with other staggered toothings formed on the thrust member and notches provided on the movable stop;
Use this type of push device for all types of steering systems: manual steering, power-assisted steering, hydraulically-assisted steering.

The invention claimed is:

1. An off-center push device for a rack-and-pinion steering of a motor vehicle, the push device comprising:
a bowed pad whereof an inner periphery is off-centered relative to an outer periphery, the pad being rotated in one direction by a compression spring and being provided to be pressed by the off-centered inner periphery against a rear of the rack to push the latter back toward gear teeth of the steering pinion, the pad being rotatably mounted on a support and the compression spring arranged at the support, preferably acting in a plane parallel to a toothing of the rack on a radial arm secured to the pad,
a clearance compensation mechanism including a thrust member translationally mounted on the support, but immobilized in rotation relative to said support, and pressed against the radial arm of the pad by the compression spring inserted between said thrust member and the support or an element secured to the support,
wherein a movable stop is rotatably mounted, coaxially to the compression spring, relative to the support or the element secured to the support, the moveable stop being provided, at an end thereof closest to the pad, with at least one toothing with staggered gear teeth cooperating with at least one notch formed on the thrust member, or vice versa, the movable stop being connected via a torsion spring to the support or to the element secured to the support, so that the notch can successively cooperate with the staggered gear teeth of the toothing.

2. The off-center push device according to claim 1, wherein the movable stop is provided with at least two toothings with staggered gear teeth, arranged on as many sectors, comprising two diametrically opposite toothings each occupying a sector of 180°, and wherein the thrust member comprises the same number of notches cooperating with those toothings, so as to stabilize the mechanism.

3. The off-center push device according to claim 1, wherein the thrust member comprises two diametrically opposite longitudinal grooves, which cooperate with two corresponding ribs provided on opposite surfaces of the support, to ensure translational guiding and rotational immobilization of the thrust member.

4. The off-center push device according to claim 1, wherein the compression spring is situated outside the movable stop, and bearing on the element fastened to the support, the movable stop being rotatably mounted relative to the bearing member.

5. The off-center push device according to claim 4, wherein the movable stop is hollow in the center thereof, a central recess housing the torsion spring, which is fastened by one end to said movable stop and is fastened by another end to the element.

6. The off-center push device according to claim 1, wherein the gear teeth of at least one staggered toothing have a generally triangular profile.

7. The off-center push device according to claim 1, wherein the gear teeth of the staggered toothings comprise asperities and/or notches, provided for embedding the corresponding notches.

* * * * *